Patented Sept. 5, 1933

1,925,749

UNITED STATES PATENT OFFICE 1,925,749

METHOD OF MAKING MAHOGANY STAIN

Samuel Henri Con'é, Wilmington, Del., assignor to The Tannin Corporation, a corporation of New York No Drawing. Application November 25, 1931
Serial No. 577,400

4 Claims. (Cl. 134—48)

My invention aims to provide an improved mahogany stain and method of producing the same from quebracho wood.

The common fault of previously used mahogany-colored wood stains has been the tendency to fade, especially when exposed to bright sunlight. Exposure to ultra-violet light has resulted in a comparatively rapid and marked fading of wood surfaces so stained.

By my invention I obtain a stain which is absolutely fadeless under all light conditions, including ultra-violet, and at the same time is unaffected by temperatures to which stained wood would be exposed in use. Also, the stained surface is not affected by the amounts of acid or base sometimes found in the atmosphere, especially near chemical works.

My stain, by being thinned with water, may be used to produce any shade in the wood surface from a black mahogany to a light cherry-red mahogany, the greater the thinning the lighter the shade. As time goes on, instead of fading, the color will gradualy become deeper, richer and more beautiful.

My stain does not harm the brush with which it is applied nor have any deleterious effect on the wood. Other advantages will be apparent to those skilled in the art as the description progresses.

I make my stain from the wood of a tree which is found in South America and is known as "aspidosperma quebracho" and is of the Apocynaceæ, or dogbane, family. In South America it is commonly called the "quebracho" (axe-breaking) tree and this general term will hereinafter be used for reasons of convenience.

An extract is obtained from the chips of this wood by applying steam, under pressure, for several hours. This extract is led into a tank and the insoluble portion which settles to the bottom is removed and will be found to be acidic in character, although insoluble in plain water. Two steps are required to dissolve this residue and produce my stain. I place the residue in a vessel provided with heating means and slowly add a concentrated hot alkali solution, stirring all the while, in sufficient quantity to produce a pasty mass having a moderately strong alkaline reaction. I then continue to add hot water in sufficient amount so that the final product (the stain) will be just slightly alkaline (that is, have a pH value between 7.0 and 8.5). The mixture is kept hot and is constantly agitated for about a day, in order to complete the dissolving stage. The resulting solution is then drawn off, cooled and filtered. My stain is now ready for use and may be thinned with water to obtain the desired shade of color. After the wood surface has been stained, it should be coated with varnish, wax or other material in the usual manner, in order to protect the stain from water.

I will now describe in detail one particular mode by which I carry out my process and obtain my stain. It will be understood that the instrumentalities which I employ are old and well known and form no part of my invention.

The quebracho logs, after removal of the bark, are reduced to small chips. These are placed in a pressure container and subjected to live steam at a pressure of about 100 pounds, for a period of several hours, at the temperature corresponding to the pressure used (about 330° F.).

The container is now opened and the extracted material, mixed with water from the condensed steam, is drawn off. Complete removal of the resulting extract and water mixture is effected by vacuum drying the chip residue.

This extract mixture is led into a settling tank and allowed to remain there until substantially all the insoluble part has settled to the bottom. The upper, or liquid, layer is pumped off and put to other uses. The insoluble residue is removed and placed in a tank. This tank is provided with steam coils in the bottom for heating purposes and with a paddle wheel or high speed blade for stirring and agitating.

To dissolve this residue I use, for each 100 pounds, 32 pounds of soda ash and 80 gallons of water. I dissolve all of the soda ash in as little of the water as possible at a temperature of about 160° F. This hot, concentrated solution is slowly added to the residue in the tank, the whole mass being constantly stirred and being kept at the 160° F. temperature by means of the steam coil heater. The result has a pasty consistency and may be alkaline to the extent of having a pH value of about 11 to 12. I now slowly add the balance of the water and raise the temperature to about 180° F. The stirring paddle or blade is now started in operation so that the mixture will be kept constantly and vigorously stirred and agitated. This digesting operation is continued for about 24 hours, by which time the residue will be well dissolved.

The resulting solution is led out from the tank, filtered and stored ready for use as a stain.

It will be found to be slightly alkaline, meaning that its pH value lies between 7.0 and 8.5.

My invention obviously is not restricted to the particular form or use thereof herein described, as other forms and uses of the method and product may be made as desired.

In the following claims, it will be understood that by the pH value is meant the measure of the hydrogen ion concentration, which is so expressed that at room temperature a solution of pH 7.0 is neutral and one of pH 14.0 is completely basic. The term "quebracho wood" is used as synonymous with "the wood of the aspidosperma quebracho tree, which is of the family Apocynaceæ". By "alkalized" is meant having been treated with an alkali so as to produce an alkaline result, that is, one which is neither neutral nor acidic.

Having disclosed one illustrative mode of carrying out my invention, what I claim and desire to secure by Letters Patent is:

1. The method of producing a fadeless mahogany stain, which consists in mixing with the steam extracted water insoluble extract of quebracho wood sufficient hot concentrated alkali solution to produce a pH value of about 11 to 12, and digesting with sufficient added hot water to produce a pH value between 7.0 and 8.5 in the final product.

2. The method of producing a fadeless mahogany stain, which consists in mixing a hot concentrated alkali solution with the substances which settle out at room temperatures from the extract obtained from quebracho wood chips which have been subjected to steam under about 100 pounds pressure for a period of hours, sufficient alkali being used to produce a pH value of 11 to 12 in the mixture, adding additional hot water and agitating for about a day at a temperature of about 180° F. in order to complete the dissolving and produce a composition having a pH value of 7.0 to 8.5 and, lastly, cooling and filtering.

3. The method set forth in claim 4 in which NaOH is used as the alkali reagent.

4. The method set forth in claim 4 in which soda ash is used as the alkali reagent.

SAMUEL HENRI CON'É.

CERTIFICATE OF CORRECTION.

Patent No. 1,925,749. September 5, 1933.

SAMUEL HENRI CON'É.

It is hereby certified that error appears in the printed specification of the above numbered patent requiring correction as follows: Page 2, lines 95 and 97, claims 3 and 4, respectively, for the reference claim number "4" read "1"; and that the said Letters Patent should be read with these corrections therein that the same may conform to the record of the case in the Patent Office.

Signed and sealed this 24th day of October, A. D. 1933.

(Seal)

F. M. Hopkins
Acting Commissioner of Patents.